(12) United States Patent
Li et al.

(10) Patent No.: US 8,890,375 B2
(45) Date of Patent: Nov. 18, 2014

(54) MULTI-FUNCTION VIBRATING DEVICE

(75) Inventors: Lin-Zhen Li, Shenzhen (CN); Suo-He Wei, Shenzhen (CN)

(73) Assignees: AAC Acoustic Technologies (Shenzhen) Co., Ltd., Shenzhen (CN); AAC Technologies Holdings, Inc., Grand Cayman (GB)

( * ) Notice: Subject to any disclaimer, the term of this patent is extended or adjusted under 35 U.S.C. 154(b) by 390 days.

(21) Appl. No.: 13/542,644

(22) Filed: Jul. 5, 2012

(65) Prior Publication Data
US 2014/0009008 A1    Jan. 9, 2014

(51) Int. Cl.
*H04R 9/02*      (2006.01)
*H02K 33/00*    (2006.01)

(52) U.S. Cl.
USPC .............. 310/17; 381/396; 381/412; 381/420

(58) Field of Classification Search
USPC ............... 381/396, 401, 412, 420; 310/15, 17
See application file for complete search history.

(56) References Cited

U.S. PATENT DOCUMENTS

| | | | | |
|---|---|---|---|---|
| 6,208,237 | B1 * | 3/2001 | Saiki et al. | 340/388.1 |
| 7,528,509 | B2 * | 5/2009 | Ueda et al. | 310/15 |
| 7,619,498 | B2 * | 11/2009 | Miura | 335/222 |
| 7,787,650 | B2 * | 8/2010 | Miura | 381/396 |
| 2003/0227225 | A1 * | 12/2003 | Kaneda et al. | 310/81 |
| 2010/0213773 | A1 * | 8/2010 | Dong et al. | 310/25 |
| 2012/0170792 | A1 * | 7/2012 | Li et al. | 381/412 |

* cited by examiner

*Primary Examiner* — Burton Mullins
(74) *Attorney, Agent, or Firm* — Anova Law Group, PLLC

(57) ABSTRACT

A multi-function vibrating device is disclosed. The multi-function vibrating device providing sound producing and vibration functions includes a holder having a hollow space, a suspension divided into at least two parts, a vibration member suspended by the suspension and having at least a pair of receiving concaves for fixing the corresponding two parts of the suspension. The multi-function vibrating device has larger vibrating amplitude and small size.

15 Claims, 6 Drawing Sheets

MULTI-FUNCTION VIBRATING DEVICE

FIELD OF THE INVENTION

The present invention relates to vibration devices, and more specifically to a multi-function vibrating device using a split-type suspension.

DESCRIPTION OF RELATED ART

Generally, a mobile communication terminal such as a cellular phone employs a multi-function vibrating device in order to generate vibration in addition to a sound signal such as bell sound to a user when a call or a message is received.

A related multi-function vibrating device includes a holder having a hollow space, a suspension assembled with the holder, a vibrating member suspended in the hollow space by the suspension and having a magnetic gap, a diaphragm facing the vibrating member with a periphery portion fixed on the holder and away from the vibrating member, and a coil attached to a lower surface of the diaphragm with a part thereof inserted into the magnetic gap of the vibrating member. The suspension forms an integral unit and includes a supporter having a closed-curve shape for engaging with the vibrating member and a plurality of spring arms extending from the supporter for fixing on the holder.

However, as the mobile communication terminal becomes smaller, the overall size of the multi-function vibrating device mounted in the mobile communication terminal should be reduced synchronously. Accordingly, the vibrating member which directly generates vibration becomes also lighter together with decreasing an outer diameter, as a result, a vibrating amplitude is also decreased. In addition, if the weight is enlarged in a circumferential direction in order to increase the vibrating amplitude, a length of the spring arm of the suspension formed between the vibrating member and the holder is reduced, thereby decreasing the elastic force supporting the vibrating member, which also decreases the vibrating amplitude.

Thus, there is an urgent need for a new multi-function vibrating device which enables increasing the vibrating amplitude with a smaller size.

DETAILED DESCRIPTION OF THE EMBODIMENTS

Figure 1:
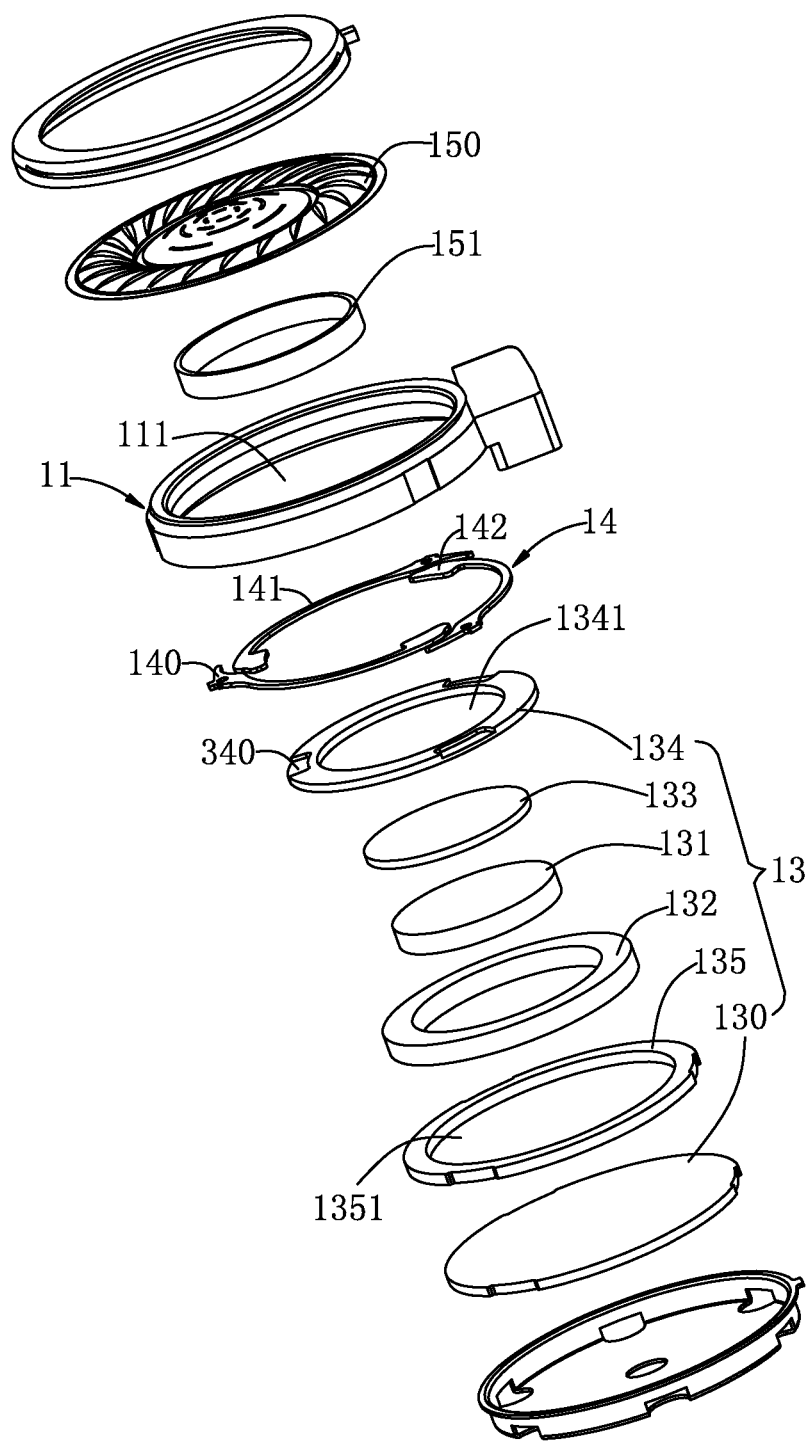
FIG. 1 is an illustrative exploded view of a multi-function vibrating device in accordance with a first exemplary embodiment of the present invention.

Reference will now be made to describe the exemplary embodiments of the present invention in detail.

Referring to FIG. 1 through FIG. 4, a multi-function vibrating device 10 in accordance with a first exemplary embodiment of the present invention comprises a holder 11 forming a hollow space 111, a split-type suspension 14 assembled with the holder 11, a vibrating member 13 suspended in the hollow space 111 by the suspension 14 and defining a magnetic gap 136, a diaphragm 150 arranged facing the vibrating member 13 with a periphery thereof fixed to the holder 11, and a voice coil 151 directly or indirectly attached to a lower surface of the diaphragm 150 with a part thereof inserted into the magnetic gap 136 of the vibrating member 13 for driving the diaphragm 150 to vibrate.

The vibrating member 13 defines a magnetic circuit part and a weight 135 integral with or attached to the magnetic circuit part. The magnetic circuit part comprises a yoke 130, an inner magnet 131 mounted on the yoke 130, an outer magnet 132 spaced apart from the inner magnet 131 and surrounding the inner magnet 131, an inner pole plate 133 attached to a top surface of the inner magnet 131, and an outer pole plate 134 attached on a top surface of the outer magnet 132. An outline of the inner magnet 131 is similar to that of the inner pole plate 133. And, an outline of the outer magnet 132 is similar to that of the outer pole plate 134. Therefore, the magnetic gap 136 is formed by an outer surface of the inner magnet 131 together with the inner pole plate 133 and an inner surface of the outer magnet 132 together with the outer pole plate 134. In this embodiment, the multi-function vibrating device 10 is provided with dual-magnets, thereby increasing the vibrating amplitude. The weight 135 has a mounting hole 1351 forming at a center thereof. The magnetic circuit part is inserted and fixed in the mounting hole 1351. Optionally, the weight 135 is mounted on the yoke 130.

The yoke 130 is made of magnetic conductive maternal and has a platy shape. The outer pole plate 134 defines a center hole 1341 and a body portion (no labeled) surrounding the center hole 1341. The body portion defines a first surface 1342, a second surface 1343 opposite to the first surface 1342, a lateral 1344 connecting the first and second surface 1342, 1343, and three receiving concaves 340 extending from the lateral 1344 toward the center hole 1341 and connecting with the first surface 1343 for forming an opening in the first surface 1342 of the body portion of the outer pole plate 134. The receiving concaves 340 are located evenly at the outer pole plate 134.

The suspension 14 allowing the vibrating member 13 to be elastically supported by the holder 11 comprises three elastic parts each having a same structure to another and spaced apart from another. The three elastic parts are coplanar. Each of the elastic parts defines a fixing portion 142 fixed on the corresponding receiving concave 340 of the outer pole plate 134, an elastic arm 141 extending from the fixing portion 142, and a fastening end 140 extending from the elastic arm 141 and secured on the holder 11. The three elastic arms are configured to be a ring. The three elastic arms extend in the same direction from corresponding fixing portions respectively. Distances between every two adjacent fixing portions 142 are equal for stabilizing and balancing the vibration of the vibrating member 13. A region of the elastic arms disposed on the ring ranges from 40% or more to less than 95% of a total region of the ring, thereby increasing the vibration amplitude of the vibrating member 13. For example, the region of the elastic arms disposed on the concentric circle may be in range of 50% to 80%. A guiding hole 1401 is disposed in each fastening end 140 for fixing the corresponding elastic part on the holder 11 firmly.

The holder 11 defines three fixtures (not shown) respectively inserted into the guiding holes 1401 of the suspension 14 to fixedly weld the fastening ends 140 of the suspension 14 to the holder 11 in a state where the fastening ends 140 are in contact with an inner surface of the holder 11.

Figure 2:
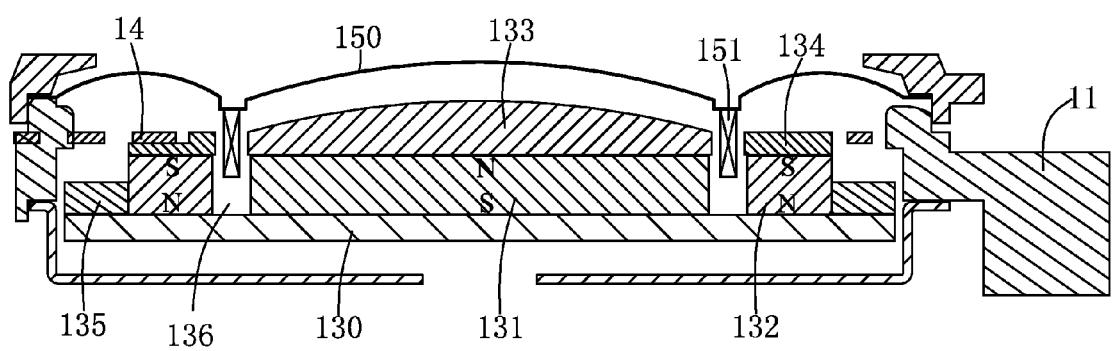
FIG. 2 is an illustrative cross-sectional view of the multi-function vibrating device.
Figure 3:
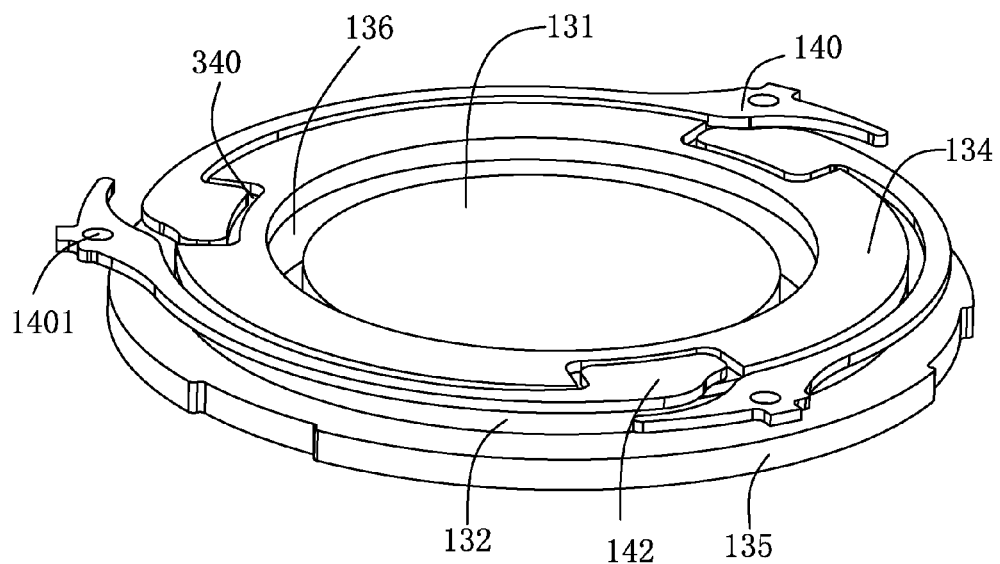
FIG. 3 is an illustrative isometric view of a vibrating member of the multi-function vibrating device, a yoke thereof being removed away.
Figure 4:
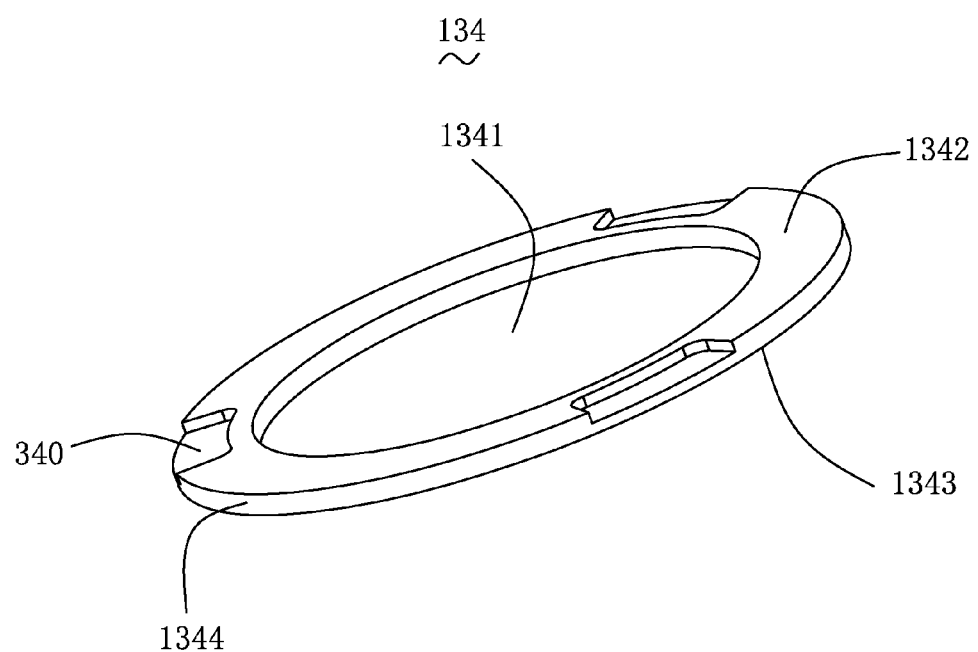
FIG. 4 is an illustrative isometric view of an outer pole plate of the multi-function vibrating device in FIG. 1.

Referring to FIG. 1 and FIG. 2, the voice coil 151 is partially inserted into the magnetic gap 136 and spaced apart from the yoke 130, the inner and outer pole plates 133, 134, and the inner and outer magnets 131, 132 at a predetermined distance.

Figure 5:
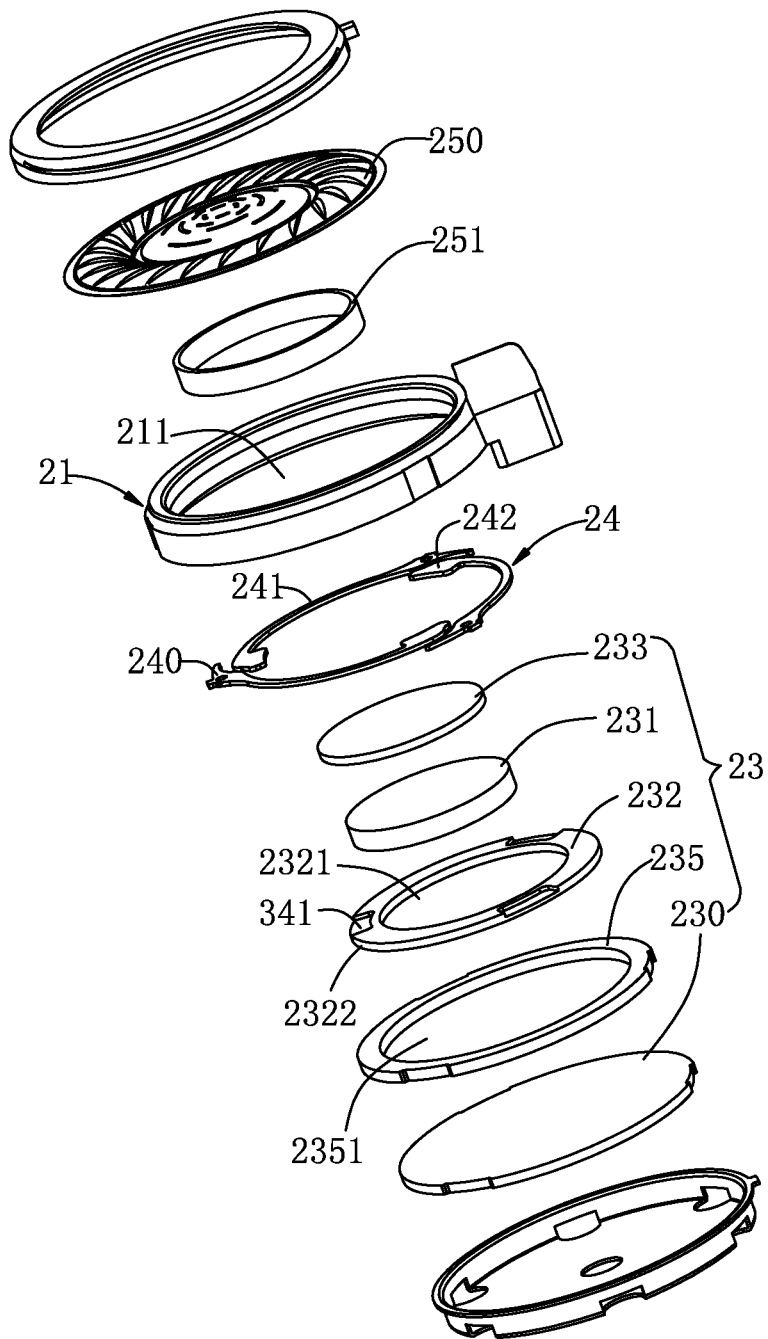
FIG. 5 is an illustrative exploded view of a multi-function vibrating device in accordance with a second exemplary embodiment of the present invention.

Referring to FIG. 5, a multi-function vibrating device 102 according to a second embodiment of the present invention comprises a holder 21 forming a hollow space 211, a split-type suspension 24 assembled with the holder 21, a vibrating member 23 suspended in the hollow space 211 by the suspension 24 and defining a magnetic gap (no labeled), a diaphragm 250 arranged facing the vibrating member 23 with a periphery thereof fixed to the holder 21, and a voice coil 251 directly or indirectly attached to a lower surface of the diaphragm 250 with a part thereof inserted into the magnetic gap of the vibrating member 23 for driving the diaphragm 250 to vibrate.

The vibrating member 23 defines a magnetic circuit part and a weight 235 integral with or attached to the magnetic circuit part. The magnetic circuit part comprises a yoke 230, an inner magnet 231 mounted on the yoke 230, an outer magnet 232 spaced apart from the inner magnet 231 and surrounding the inner magnet 231, and an inner pole plate 233 attached to a top surface of the inner magnet 231. An outline of the inner magnet 231 is similar to that of the inner pole plate 233. Therefore, the magnetic gap is formed by an outer surface of the inner magnet 231 together with the inner pole plate 233 and an inner surface of the outer magnet 132. In this embodiment, the multi-function vibrating device 102 is provided with dual-magnets, thereby increasing the vibrating amplitude. The weight 235 has a mounting hole 2351 forming at a center thereof. The magnetic circuit part is inserted and fixed in the mounting hole 2351. Optionally, the weight 235 is mounted on the yoke 230. The yoke 130 is made of magnetic conductive maternal and has a platy shape. The outer magnet 232 defines a center hole 2321, a sidewall 2322 surrounding the center hole 2321 and three receiving concaves 341 formed in a top surface of the sidewall 2322 for fixing the suspension 24.

The suspension 24 allowing the vibrating member 23 to be elastically supported by the holder 21 comprises three elastic parts each having a same structure to another and spaced apart from another. The three elastic parts are coplanar. Each of the elastic parts defines a fixing portion 242 fixed on the corresponding receiving concave 341 of the outer magnet 235, an elastic arm 241 extending from the fixing portion 242, and a fastening end 240 extending from the elastic arm 241 and secured on the holder 21. The three elastic arms are configured to be a ring. The three elastic arms extend in the same direction from the corresponding fixing portions 242 respectively. Distances between every two adjacent fixing portions 242 are equal for stabilizing and balancing the vibration of the vibrating member 23. A guiding hole 2401 is disposed in each fastening end 240 for fixing the corresponding elastic part on the holder 21 firmly.

The second embodiment of the present invention is similar to the first embodiment of the present invention except that an outer pole plate is omitted and the receiving concaves 341 are formed on an outer magnet 232.

Figure 6:
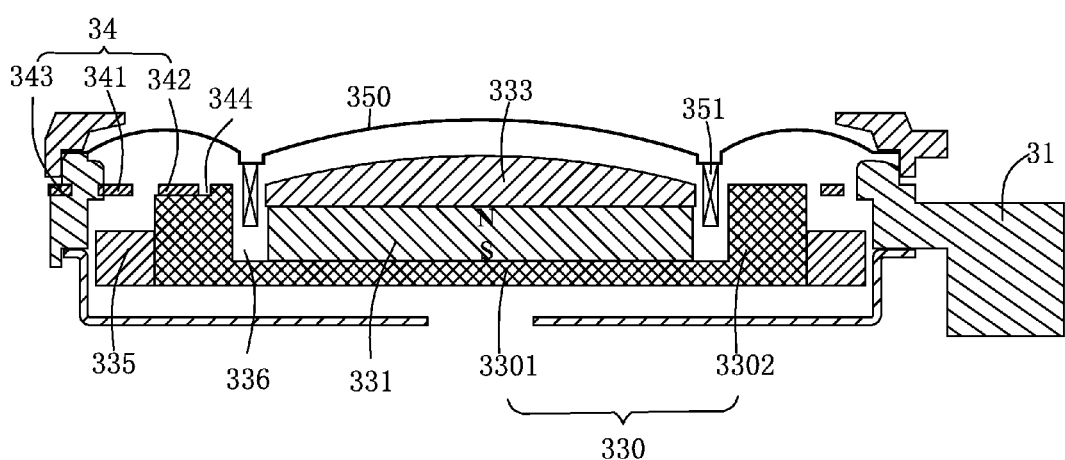
FIG. 6 is an illustrative cross-sectional view of the multi-function vibrating device in accordance with a third exemplary embodiment of the present invention.

Referring to FIG. 6, a multi-function vibrating device 103 according to a third embodiment of the present invention comprises a holder 31 forming a hollow space (no labeled), a split-type suspension 34 assembled with the holder 21, a vibrating member (no labeled) suspended in the hollow space by the suspension 34 and defining a magnetic gap 336, a diaphragm 350 arranged facing the vibrating member with a periphery thereof fixed to the holder 31, and a voice coil 351 directly or indirectly attached to a lower surface of the diaphragm 350 with a part thereof inserted into the magnetic gap 336 of the vibrating member for driving the diaphragm 350 to vibrate.

The vibrating member defines a magnetic circuit part and a weight 335 integral with or attached to the magnetic circuit part. The magnetic circuit part comprises a yoke 330, an inner magnet 331 mounted on the yoke 330, and an inner pole plate 333 attached to a top surface of the inner magnet 331. An outline of the inner magnet 331 is similar to that of the inner pole plate 333. The yoke 330 has a bottom 3301, a plurality of side portions 3302 extending from the bottom 3301 toward a diaphragm 350 and three receiving concaves 344 formed in a top surface of the side portions 3302. Therefore, the yoke 330, an inner magnet 331 and an inner pole plate 333 are fastened together as a single unit of an inner-magnet type. The magnetic gap 336 is formed by an inner surface of the side portions 3320 and an outer surface of the inner magnet 131 and the inner pole plate 133.

The suspension 34 allowing the vibrating member 33 to be elastically supported by the holder 31 comprises three elastic parts each having a same structure to another and spaced apart from another. Each of the elastic parts has a fixing portion 342 fixed on the corresponding receiving concave 344 of the yoke 330, an elastic arm 341 extending from the fixing portion 342, and a fastening end 343 extending from the elastic arm 341 and secured on the holder 31.

Figure 7:
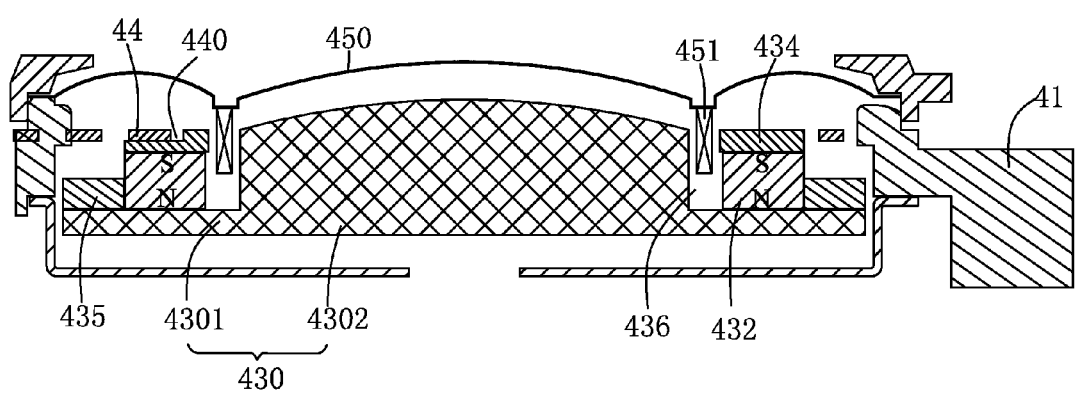
FIG. 7 is an illustrative cross-sectional view of a multi-function vibrating device in accordance with a fourth exemplary embodiment of the present invention.

Referring to FIG. 7, a multi-function vibrating device 104 according to a fourth embodiment of the present invention comprises a holder 41 forming a hollow space (no labeled), a split-type suspension 44 assembled with the holder 41, a vibrating member (no labeled) suspended in the hollow space by the suspension 44 and defining a magnetic gap 436, a diaphragm 450 arranged facing the vibrating member with a periphery thereof fixed to the holder 41, and a voice coil 451 directly or indirectly attached to a lower surface of the diaphragm 450 with a part thereof inserted into the magnetic gap of the vibrating member for driving the diaphragm 450 to vibrate.

The vibrating member defines a magnetic circuit part and a weight 435 integral with or attached to the magnetic circuit part. The magnetic circuit part comprises a yoke 430, an outer magnet 432 mounted on the yoke 430, and an outer pole plate 434 attached to a top surface of the outer magnet 432. An outline of the outer magnet 434 is similar to that of the outer pole plate 434.

The yoke 430 has a mounting portion 4301 and a projecting portion 4302 extending from a center of the mounting portion 4301 and taken the place of the inner magnet of the first embodiment of the present invention. Therefore, the yoke 430, an outer magnet 432 and an outer pole plate 434 are fastened together as a single unit of an outer magnet-type. The magnetic gap 436 is formed by an outer surface of the projecting portion 4302 and an inner surface of the outer magnet 432 and the outer pole plate 434.

The number of elastic parts is determined in consideration of a gravity center of the vibrating member elastically supported by the suspension, and preferably at least two elastic parts are formed. The number of the receiving concaves of the outer pole plate accords with that of the elastic parts. In this embodiment, the suspension has three elastic parts. In an alternative embodiment of the invention, the outer pole plate defines a pair of receiving concaves located at equal distance with a 180° separation in order to effectively guide the vibrating member to vibrate approaching and away from the diaphragm, thereby the vibrating of the vibrating member is stable and balanced.

According to the multi-function vibrating device, the suspension is divided into at least two parts, thereby increasing the vibrating amount and decreasing the size of the multi-function vibrating device.

While the present invention has been described with reference to the specific embodiments, the description of the invention is illustrative and is not to be construed as limiting the invention. Various of modifications to the present invention can be made to the exemplary embodiments by those skilled in the art without departing from the true spirit and scope of the invention as defined by the appended claims.

What is claimed is:

1. A multi-function vibrating device, comprising:
a holder forming a hollow space;
a suspension assembled with the holder and having at least a pair of elastic parts spaced apart from each other, each elastic part having a fixing portion, an elastic arm extending from the fixing portion, and a fastening end extending from the elastic arm and secured on the holder;
a vibrating member suspended in the hollow space by the suspension, the vibrating member having a yoke, an inner magnet mounted on the yoke, an outer magnet mounted on the yoke, and an outer pole plate mounted on the outer magnet and forming a magnetic gap together with the inner and outer magnets, the outer pole plate having at least a pair of receiving concaves separated from each other in space for fixing the fixing portions of the suspension;
a diaphragm arranged facing the vibrating member;
a voice coil driving the diaphragm to vibrate and partially inserted into the magnetic gap.

2. The multi-function vibrating device as described in claim 1, the elastic parts are coplanar with respect to each other.

3. The multi-function vibrating device as described in claim 2, the elastic arms are configured to be a part of a circle and disposed on a circle.

4. The multi-function vibrating device as described in claim 3, wherein a region of the elastic arms disposed on the circle ranges from 40% or more to less than 95% of a total region of the circle, thereby increasing the vibrating amount.

5. The multi-function vibrating device as described in claim 4, wherein the elastic arms extend in the same direction from corresponding fixing portions respectively.

6. The multi-function vibrating device as described in claim 1, wherein the outer pole plate further has a first surface, a second surface opposite to the first surface, and a lateral connecting the first and second surface and the receiving concaves extends from the lateral toward a center thereof and connects with the first surface of the outer pole plate.

7. The multi-function vibrating device as described in claim 6, wherein the receiving concaves are located at equal distances in the outer pole plate in order to effectively guide the vibrating member to vibrate approaching and away from the diaphragm.

8. The multi-function vibrating device as described in claim 6, wherein the outer pole plate has three receiving concaves located at equal distances.

9. The multi-function vibrating device as described in claim 1, wherein the vibrating member further defines a weight mounted on the yoke and surrounding the outer magnet.

10. A multifunctional vibrating actuator, comprising:
a holder forming a hollow space;
a suspension assembled with the holder and having at least a pair of elastic parts spaced apart from each other, each elastic part having a fixing portion, an elastic arm extending from the fixing portion, and a fastening end extending from the elastic arm and secured on the holder;
a diaphragm arranged facing the vibrating member;
a vibrating member suspended in the hollow space by the suspension and facing the diaphragm, the vibrating member having a yoke and an inner magnet mounted on the yoke, the yoke having a bottom, a plurality of side portions extending from the bottom toward the diaphragm for forming a magnetic gap with the inner magnet, and at least a pair of receiving concaves formed in a top surface of the side portions for fixing the fixing portions of the suspension, the receiving concaves separated from each other in space;
a voice coil partially inserted into the magnetic gap.

11. The multi-function vibrating device as described in claim 10, the elastic parts are coplanar with respect to each other.

12. A multifunctional vibrating actuator, comprising:
a holder forming a hollow space;
a suspension assembled with the holder and having at least a pair of elastic parts spaced apart from each other, each elastic part having a fixing portion, an elastic arm extending from the fixing portion, and a fastening end extending from the elastic arm and secured on the holder;
a vibrating member suspended in the hollow space by the suspension and facing the diaphragm, the vibrating member having a pair of receiving concaves separated from each other in space for fixing the fixing portions of the suspension;
a diaphragm arranged facing the vibrating member;
a voice coil attached to the diaphragm and partially inserted into the magnetic gap.

13. The multi-function vibrating device as described in claim 12, the vibrating member has a yoke and an outer magnet mounted on the yoke, the yoke has a bottom and a projecting portion extending from a center of the bottom for forming a magnetic gap together with the outer magnet, the receiving concaves are formed on the outer magnet.

14. The multi-function vibrating device as described in claim 12, the vibrating member has a yoke, an outer magnet mounted on the yoke and an outer pole plate mounted on the outer magnet, the yoke has a bottom and a projecting portion extending from a center of the bottom for forming a magnetic gap together with an inner surface of the outer magnet and the outer pole plate, the receiving concaves are formed on the outer pole plate.

15. The multi-function vibrating device as described in claim 12, the vibrating member has a yoke, an inner magnet mounted on the yoke and an outer magnet mounted on the yoke forming a magnetic gap together with the inner magnet, the receiving concaves are formed on the outer magnet.

* * * * *